3,160,470
DISSOLUTION OF URANIUM OXIDE
Maurice C. Lambert, Richland, Wash., assignor to the United States of America as represented by the United States Atomic Energy Commission
No Drawing. Filed Feb. 27, 1962, Ser. No. 176,166
7 Claims. (Cl. 23—14.5)

This invention deals with a process of dissolving uranium oxide in a molten chloride mixture as the uranyl chloride by introducing a chlorinating agent, and it also deals with the regeneration of neutron-bombarded uranium oxide for reuse.

Dissolution of uranium oxide is necessary for its regeneration after neutron bombardment, namely by the removal of the fission products. Dissolution is also one step of many processes used for the conversion of the uranium oxide to metallic uranium. Furthermore, in order to purify technical-grade uranium oxide, dissolution in a molten salt and precipitation therefrom have accomplished the result desired.

Heretofore uranium oxides have been dissolved in molten chloride solutions, such as potassium chloride-sodium chloride, potassium chloride-lead chloride and potassium chloride-zinc chloride, by introducing a chlorinating agent, such as chlorine gas. These conventional methods, however, have one drawback, namely that the dissolution is very slow, even at temperatures as high as 700° C., which is probably due to the low solubility of the chlorine gas in fused salt mixtures. For instance, in potassium chloride-sodium chloride eutectic, only 53 p.p.m. of chlorine are soluble at a temperature of 700° C. A rapid dissolution is particularly desirable, however, because the use of the chlorinating agent at elevated temperatures causes a corrosion problem, and, of course, because a short contact time with the chlorinating agent restricts corrosion to a minimum.

It is an object of this invention to provide a process for the dissolution of uranium oxide in a chloride mixture by means of a chlorinating agent which proceeds at a comparatively fast rate.

It is another object of this invention to provide a process for the dissolution of uranium oxide in a chloride mixture by means of a chlorinating agent which is simple and inexpensive.

It is finally also an object of this invention to provide a process for the dissolution of uranium oxide in a chloride mixture by means of a chlorinating agent that uses a salt mixture of a particularly low melting point so that the corrosive effect of the chlorinating agent is relatively small.

It has been found that certain chlorides, when added to the salt mixture prior to chlorination even in catalytic amounts, accelerate the dissolution of uranium oxides. Chlorides that were found to have this obviously catalytic effect are thallous chloride, cuprous chloride and ferrous chloride. Any of these three chlorides reduces the dissolution time of uranium dioxide and $U_3O_8$, but for uranium trioxide the catalytic effect does not exist to a practicable degree.

The process of this invention comprises introducing the uranium oxide material to be treated into a molten chloride mixture, adding a small amount of thallous chloride, cuprous chloride and/or ferrous chloride as a catalyst, and introducing a chlorinating agent into the molten mass whereby uranium oxide is dissolved as uranyl chloride.

While a great many chloride mixtures can be used as the solvent for the uranium oxide, three chloride eutectics were found particularly satisfactory. The sodium chloride-potassium chloride eutectic, which has approximately equimolar composition and melts at about 660° C., the potassium chloride-lead chloride eutectic, which contains 47.3 mole percent of potassium chloride and 52.7 mole percent of lead chloride and has a melting point of 411° C., and the potassium chloride-zinc chloride eutectic, which also contains about equimolar amounts of both ingredients, are suitable. It is not necessary, however, that the mixtures employed be of eutectic composition. Moreover, other salt mixtures including KCl—$MgCl_2$, NaCl—$CaCl_2$, LiCl—KCl, NaCl—LiCl, may be employed. A mixture of potassium chloride alone with thallous chloride, however, has also been found suitable.

Chlorine gas or phosgene can be used as a chlorinating agent for the process of this invention.

The temperature necessary for the reaction, of course, is dependent upon the melting point of the salt mixture; apart from this, an increase of the temperature does not have a remarkable effect on the dissolution rate. For instance, at 500° C., 1.1 grams of uranium were dissolved in the potassium chloride-lead chloride eutectic, while at 600° C. the quantity was 1.2 grams per hour.

The amount of the chloride catalyst can vary widely; it can be added either in catalytic amounts or it can form a substantial ingredient of the chloride salt solvent. The preferred range for the catalyst content of the salt mixture is from 0.5 to 3 mole percent. In the presence of the catalyst, the dissolution rate was several times as high as that without the catalyst. For instance, a content of 0.5 mole percent of thallous chloride in the potassium chloride-lead chloride eutectic increased the dissolution rate of $U_3O_8$ with chlorine gas by a factor of six.

The uranium oxide, as has been stated before, is dissolved as the uranyl chloride. This uranyl chloride can then be converted to uranium dioxide by methods known to those skilled in the art. For instance, this can be accomplished by contact with a metal such as bismuth, lead, tin, cadmium, zinc and magnesium, it can be achieved by reaction with hydrogen or dry ammonia gas at between 750 and 800° C., or it can be effected by electrolysis using, for instance, graphite electrodes, a voltage of from 2 to 3 volts and a current density of between 2 and 40 amperes per square decimeter.

In the following a few examples are given to illustrate the improvement accomplished by this invention.

EXAMPLE I

Various kinds of uranium oxides were dissolved in different molten chloride mixtures by sparging the molten salt with chlorine gas. The conditions in all runs were the same. The time when the samples were completely dissolved was determined, and from it and the weight of the sample the dissolution rates were computed. The conditions of the runs and the dissolution rates expressed in grams of uranium dissolved per hour are compiled in Table I.

Table I

| Chloride Solvent | | Uranium Oxide | Temp., ° C. | U Dissolved, g./hr. |
|---|---|---|---|---|
| System | Mole Ratio | | | |
| $ZnCl_2$—KCl | 1/1 | $UO_3$ | 300 | 0.14 |
| $ZnCl_2$—KCl | 1/1 | $UO_2$ | 300 | 0.008 |
| $ZnCl_2$—KCl | 1/1 | $UO_3$ | 500 | 0.54 |
| $ZnCl_2$—KCl | 1/1 | $U_3O_8$ | 500 | 0.32 |
| $ZnCl_2$—KCl | 1/1 | $UO_2$ | 500 | 0.016 |
| $ZnCl_2$—KCl | 1/1 | $UO_3$ | 700 | 0.88 |
| $ZnCl_2$ only | | $UO_3$ | 700 | 0.08 |
| $HgCl_2$—KCl | 0.68/0.32 | $UO_3$ | 200 | 0.22 |
| $CdCl_2$—KCl | 1/1 | $UO_3$ | 500 | 0.50 |
| $PbCl_2$—KCl | 0.52/0.48 | $UO_3$ | 500 | 1.1 |
| $PbCl_2$—KCl | 0.52/0.48 | $UO_3$ | 600 | 1.2 |
| $NaNO_3$—$KNO_3$ | 1/1 | $UO_2$ | 300 | <0.00006 |
| TlCl—KCl | 1/1 | $UO_2$ | 650 | >42 |
| TlCl—KCl | 1/3 | $UO_2$ | 650 | >42 |

The above results indicate that the presence of thallous chloride has a drastic effect on the dissolution rate of the uranium oxides.

Almost as favorable results were obtained, however, when the thallous chloride was added to a sodium chloride-potassium chloride eutectic instead of to potassium chloride only and in a quantity considerably less than that used in the last two runs of Table I. This is shown in Example II.

EXAMPLE II

Two parallel experiments were carried out using as the starting material a uranium dioxide that had a particle size of between 325 and 100 mesh and an oxygen:uranium atom ratio of 2.001. The conditions in both experiments were identical except that in the first experiment the salt solvent was simply an equimolar mixture of potassium chloride and sodium chloride, while in the second experiment the salt mixture furthermore contained 1.42 mole percent of thallous chloride. Chlorine gas was the chlorinating agent. The operating temperature was 700° C.

While in the run without the thallous chloride 0.155 gram of uranium had dissolved in 30 minutes, 6.2 grams had dissolved in the same period of time in the salt solution containing the thallous chloride. This is an increase by a factor of about 40.

The temperature in the second run was maintained at 700° C. in order to make the results comparable.

EXAMPLE III

Another comparison was made using three different chloride mixtures with and without the catalysts of this invention. The dissolution rates obtained without the catalyst were considered unity, and the dissolution rates obtained with the various catalysts were based on and compared with this figure. The results are compiled in Table II.

*Table II*

[KCl.NaCl (50-50 mole percent) eutectic at 700° C.]

| Oxide | Catalyst | Relative rate |
|---|---|---|
| $UO_2$ | | 1 |
| $UO_2$ | 1.0 m/o TlCl | 31 |
| $UO_2$ | 1.0 m/o CuCl | 21 |
| $UO_2$ | 1.0 m/o FeCl$_2$ | 11 |
| $UO_2$ | 2.0 m/o FeCl$_2$ | 30 |
| $UO_2$ | 3.0 m/o TlCl | 75 |

[KCl.PbCl$_2$ (2.5/1 mole ratio) eutectic at 500° C.]

| | | |
|---|---|---|
| $UO_2$ | | 1 |
| $UO_2$ | 0.5 m/o TlCl | 37 |
| $UO_2$ | 0.5 m/o CuCl | 29 |
| $UO_2$ | 0.5 m/o FeCl$_3$ | 26.5 |

[KCl.ZnCl$_2$ (50-50 mole percent) eutectic at 300° C.]

| | | |
|---|---|---|
| $UO_2$ | | 1 |
| $UO_2$ | 1.0 m/o TlCl | 13 |
| $UO_2$ | 3.0 m/o TlCl | 67 |
| $UO_2$ | 1.0 m/o CuCl | 29 |
| $UO_2$ | 3.0 m/o CuCl | 82 |
| $U_3O_8$ | | 1 |
| $U_3O_8$ | 1.0 m/o TlCl | 4 |
| $U_3O_8$ | 3.0 m/o TlCl | 11 |
| $U_3O_8$ | 1.0 m/o CuCl | 16 |
| $U_3O_8$ | 3.0 m/o CuCl | 26 |

It will be noted from the above results that the effect of the catalysts is greater on the dissolution of uranium dioxide than it is for that of $U_3O_8$. It is also obvious from the above experiments that a concentration of 3 mole percent of the catalyst brings about greater dissolution rates than do the lower concentrations. The use of lower temperatures (300° C. for the potassium chloride-zinc chloride mixture) yields at least as high dissolution rates as do, for instance, the experiments using potassium chloride-sodium chloride salt solvent at 700° C. This, too, indicates that the temperature has very little effect on the dissolution rate, which is an advantage because the corrosion is considerably lower at the lower temperatures.

It will be understood that the invention is not to be limited to the details given herein but that it may be modified within the scope of the appended claims.

What is claimed is:

1. A process of dissolving uranium dioxide or $U_3O_8$ in a molten chloride mixture, comprising melting a chloride solvent selected from the group consisting of sodium-potassium chlorides, lead-potassium chlorides, potassium-magnesium chlorides, sodium-calcium chlorides, potassium-lithium chlorides, sodium-lithium chlorides, and zinc-potassium chlorides; adding said uranium oxide to said solvent; adding a catalyst selected from the group consisting of thallous chloride and ferrous chloride to the molten mass in a quantity to yield a concentration of from 0.5 to 3 mole percent in the salt; and introducing a chlorinating agent into the molten mass whereby uranium oxide is dissolved as uranyl chloride.

2. The process of claim 1 wherein the catalyst is thallium chloride.

3. The process of claim 2 wherein the catalyst is present in the salt in a concentration of from 0.5 to 3 mole percent.

4. The process of claim 2 wherein the chlorinating agent is chlorine gas.

5. The process of claim 1 wherein the catalyst is ferrous chloride.

6. A process of treating uranium oxide to free it of fission products, comprising melting a solvent selected from the group consisting of sodium-potassium chlorides, lead-potassium chlorides, potassium-magnesium chlorides, sodium-calcium chlorides, potassium-lithium chlorides, sodium-lithium chlorides, and zinc-potassium chlorides; adding from 0.5 to 3 mole percent of a catalyst selected from the group consisting of thallous chloride and ferrous chloride; adding said fission-products-containing uranium oxide; sparging the molten mass with chlorine gas whereby the fission products are dissolved as chlorides and the uranium as uranyl chloride; and precipitating uranium dioxide from the solution away from the fission product chlorides.

7. The process of claim 6 wherein the uranium dioxide is precipitated by electrolysis.

References Cited by the Examiner

UNITED STATES PATENTS

| 3,011,865 | 12/61 | Benedict et al. | 23—14.5 |
| 3,030,176 | 4/62 | Lyon | 23—14.5 |
| 3,102,849 | 9/63 | Wall et al. | 23—14.5 |

OTHER REFERENCES

AEC Documents: IDO-14478, pp. 9-23, August 10, 1959, IDO-14578, pp. 1-19, February 5, 1962.

CARL D. QUARFORTH, *Primary Examiner.*

REUBEN EPSTEIN, *Examiner.*